US008929918B2

(12) United States Patent
Siomina et al.

(10) Patent No.: US 8,929,918 B2
(45) Date of Patent: Jan. 6, 2015

(54) POSITIONING AND LOCATION SERVICES USING CIVIC ADDRESS INFORMATION

(75) Inventors: Iana Siomina, Solna (SE); Michael Anderson, Alpharetta, GA (US); Torbjörn Wigren, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 516 days.

(21) Appl. No.: 12/871,984

(22) Filed: Aug. 31, 2010

(65) Prior Publication Data
US 2011/0250906 A1 Oct. 13, 2011

Related U.S. Application Data

(60) Provisional application No. 61/321,523, filed on Apr. 7, 2010, provisional application No. 61/332,984, filed on May 10, 2010.

(51) Int. Cl.
| H04W 24/00 | (2009.01) |
| H04W 4/02 | (2009.01) |
| H04L 29/08 | (2006.01) |
| H04W 4/00 | (2009.01) |

(52) U.S. Cl.
CPC *H04W 4/02* (2013.01); *H04L 67/18* (2013.01)
USPC .................. 455/456.2; 455/456.1; 455/456.3; 370/338

(58) Field of Classification Search
USPC ....................................... 455/456.2
See application file for complete search history.

(56) References Cited

U.S. PATENT DOCUMENTS

| 5,418,537 | A | 5/1995 | Bird |
| 6,823,260 | B1 | 11/2004 | Turcotte |
| 7,139,820 | B1 * | 11/2006 | O'Toole et al. ............... 709/223 |
| 2005/0034074 | A1 * | 2/2005 | Munson et al. ............... 715/712 |
| 2007/0027997 | A1 * | 2/2007 | Polk .............................. 709/230 |
| 2007/0173264 | A1 * | 7/2007 | Duan ......................... 455/456.1 |
| 2007/0191029 | A1 * | 8/2007 | Zarem et al. ............... 455/456.5 |
| 2007/0233817 | A1 * | 10/2007 | Johnson et al. ............... 709/219 |
| 2007/0238448 | A1 | 10/2007 | Gallagher et al. |

(Continued)

OTHER PUBLICATIONS

3rd Generation Partnership Project. "Universal Geographical Area Description (GAD)." 3GPP TS 23.032 V9.0.0, Dec. 2009, pp. 1-29, Sophia Antipolis Valbonne, France.

(Continued)

*Primary Examiner* — Timothy Pham
(74) *Attorney, Agent, or Firm* — Coats & Bennett, PLLC

(57) ABSTRACT

Positioning and location services are provided in a wireless communication network using civic address information. The civic address information may comprise a data structure including textual Information Elements such as apartment or office number, street number, street name, city, state, postal code, and the like. A positioning method is defined comprising performing a civic address lookup to obtain a location in civic address format for an identified node, based upon information about the identified node's serving (or associated) node and neighbor nodes. Signaling is defined to request the civic address positioning method, to exchange capabilities, to communicate location information using a civic address format, report a positioning failure and optionally the failure cause, and the like. Location information may be translated between a civic address format and a 3GPP or 3GPP2 positioning format. The positioning method and associated signaling are particularly advantageous in indoor environments, where conventional positioning methods fare poorly or fail altogether.

26 Claims, 9 Drawing Sheets

(56) References Cited

U.S. PATENT DOCUMENTS

| | | | |
|---|---|---|---|
| 2007/0249364 A1 | 10/2007 | Bells et al. | |
| 2008/0227462 A1* | 9/2008 | Freyman et al. | 455/456.1 |
| 2010/0008337 A1* | 1/2010 | Bajko | 370/338 |
| 2010/0203902 A1* | 8/2010 | Wachter et al. | 455/456.3 |

OTHER PUBLICATIONS

Wigren et al "Emergency Call Delivery Standards Impair Cellular Positioning Accuracy", to appear in Proceeding of IEEE ICC 2010, Cape Town, South Africa, May 2010.

3rd Generation Partnership Project. "Evolved Universal Terrestrial Radio Access Network "EUTRAN); S1 Application Protocol (S1AP)", 3GPP TS 36.413 V9.0.0, Sep. 2009, pp. 1-227, Sophia Antipolis Valbonne, France.

3rd Generation Partnership Project. "Functional Stage 2 Description of Location Services (LCS)." 3GPP TS 23.271 V9.2.0, Dec. 2009, pp. 1-168, Sophia Antipolis Valbonne, France.

Schulzrinne et al. "Requirements for Emergency Context Resolution with Internet Technologies", RFC 5012, Jan. 2008, pp. 1-23.

T. Wigren. "Adaptive Enhanced Cell ID Fingerprinting Localization by Clustering of Precise Position Measurements." IEEE Transactions on Vehicular Technology, Sep. 2007, vol. 56, No. 5, pp. 3199-3209.

T. Wigren et al. "RTT positioning in WCDMA.", Proceedings of the 5th international conference on wireless and mobile communications, Cannes/La Bocca, France, Aug. 23-29, 2009, pp. 303-308.

3rd Generation Partnership Project. "Location for Ims Emergency Calls." 3GPP TSG SA WG2 Architecture—S2#45, S2-050605, Apr. 4-8, 2005, Beijing, China, pp. 1-9.

Prasithsangaree, P. et al. "On indoor pisition location with wireless lans." The 13th IEEE International Symposium on Personal, Indoor and Mobile Radio Communications, vol. 2, 2002, Sep. 15-18, 2002, XP010614319, pp. 720-724.

\* cited by examiner

POSITIONING AND LOCATION SERVICES USING CIVIC ADDRESS INFORMATION

This application claims priority to U.S. Provisional Patent Application Ser. No. 61/321,523, filed Apr. 7, 2010, titled "Signalling Support for Using the Address Information for Positioning, Location and Location-Based Services," and also to U.S. Provisional Patent Application Ser. No. 61/332,984, filed May 10, 2010, titled "Methods for Using the Address Information for Positioning, Location and Location-Based Services," the disclosures of both of which are incorporated herein by reference in their respective entireties.

FIELD OF INVENTION

The present invention relates generally to wireless communication networks, and in particular to positioning and location services using civic address information, and positioning and location services signaling wherein positioning information is expressed in a civic address format.

BACKGROUND

The possibility of identifying the geographic location of users in cellular wireless communication networks has enabled a large variety of commercial and non-commercial services, e.g., navigation assistance, social networking, location-aware advertising, emergency calls, and the like. Different services may have different positioning accuracy requirements imposed by the application. In addition, some regulatory requirements on the positioning accuracy for basic emergency services exist in some countries, i.e., FCC E911 in the USA.

The accuracy of the provided result, as well as the response time, depend on a number of factors, such as terminal capability, network capability, requested quality of service (QoS), positioning methods availability, and the positioning method selection procedure employed. The following positioning technologies are currently being considered for the Long Term Evolution (LTE) cellular system: Assisted Global Navigation Satellite System (A-GNSS), Time Difference of Arrival (TDOA), Fingerprinting, Angle of Arrival (AoA), Enhanced Cell ID (E-CID), Cell ID (CID), and Hybrid positioning. The variety of the standardized methods is explained not only by the range of applications and location services (LCS), but also by their environment- and deployment-dependent performance. In challenging environments, different methods may also complement each other to achieve the desired accuracy, e.g., by being hybridized. It has also been shown that using various types of measurements and positioning-related information can enhance positioning performance significantly, which is exploited, for example, in the Adaptive E-CID (AECID) positioning method.

The input to the positioning function, which performs the actual positioning of a specific target node, e.g., User Equipment (UE) or radio node, is a positioning request from an LCS Client with a set of parameters, such as QoS requirements. The end results of the positioning function are the location information for the positioned target node, communicated as a part of the positioning response. An LCS client is a software and/or hardware entity which may or may not reside in the target node being positioned. The LCS client may be internal or external to the Public Land Mobile Network (PLMN).

The location information may be requested by, and reported to, an LCS Client associated with a UE or radio node, or by an LCS Client within or attached to the Core Network. The location information may also be utilized internally in the system; for example, for location-assisted handover or to support other features, such as home location billing. The location information request may ask for the velocity of a UE as part of the positioning information.

The target nodes may have different characteristics and thus may have different capabilities which may impact the amount and the contents of any downloaded assistance information, the set of feasible reporting formats, and the positioning method selection. The target node capability may be signaled together with the positioning request or may be requested later by the positioning server, prior to calling the positioning function. To inform the target node of network capabilities, e.g., the set of available positioning methods, the network capability information may also be communicated to the target node.

In 3GPP or 3GPP2 networks, there is no concept of using civic address information in any way for positioning purposes. As used herein, the terms "civic address information" and position information in a "civic address format" means location information expressed in textual fields commonly used in civic life to communicate address or location information, such as street name and number, city, state, postal code, and the like. In contrast, as used herein, the term "3GPP positioning format" refers to any of the positioning formats defined in the 3GPP Technical Specification TS 23.032, "Universal Geographical Area Description (GAD)." These positioning formats are defined for LCS in wireless communication networks. 3GPP positioning formats include, e.g., a polygon; an ellipsoid arc; an ellipsoid point; an ellipsoid point with uncertainty circle; an ellipsoid point with uncertainty ellipse; an ellipsoid point with altitude; and an ellipsoid point with altitude and uncertainty ellipsoid; as described in greater detail herein.

An attempt to utilize civic address information in connection with location is being made in non-3GPP IP access networks within the Internet Engineering Task Force (IETF) community (see, e.g., Requirements for Emergency Context Resolution with Internet Technologies, RFC 5012, January 2008, the disclosure of which is incorporated herein by reference in its entirety). In these applications, the location information is used by emergency call routing entities to route emergency calls to the appropriate Public Safety Answer Point (PSAP) with the minimum delay. The location information comprises either the civic address or (longitude, latitude, [altitude]) information. The location information can be entered by the user or it can be acquired by the user/UE from the access network or a proxy over the Internet Protocol (IP) layer. The location-to-PSAP mapping functionality maps the location to the Uniform Resource Identifier (URI) of the PSAP. This is primarily intended for emergency calls and IP Multimedia Subsystem (IMS) networks, and all of the functions are performed over IP. However, these efforts do not interwork with 3GPP/3GPP2 networks, and will not provide location information for such a request.

FIG. 1 depicts the general arrangement of the Location Service (LCS) feature in a 3GPP network comprising GSM, UMTS and LTE where the LCS entities within the Radio Access Network (RAN) communicate with the Core Network (CN) across the A, Gb, Iu and S1 interfaces. Communication among the RAN LCS entities makes use of the messaging and signaling capabilities of the RAN. As part of their service or operation, the LCS Clients may request the location information of UE. The clients make their requests to a LCS Server. There may be more than one LCS Client and more than one LCS Server. The client must be authenticated and the resources of the network must be coordinated including the UE and the calculation functions, to estimate the location and optionally, velocity of the UE, and the result returned to the client. As part of this process, information from other systems (other RANs) can be used.

FIG. 2 shows the general arrangement of the Location Service (LCS) feature in an Interworking WLAN (I-WLAN), illustrating the relation of LCS Clients and servers in the core network with the WLAN Access Networks (e.g., IEEE 802.11). The LCS La interface is added to support LCS for I-WLAN.

The exact positioning procedure flow depends on the origin of the positioning request. In 3GPP networks, the following types of positioning, or location, requests (LRs) exist: Network-induced LR (NI-LR); Mobile-terminated LR (MT-LR); and Mobile originating LR (MO-LR). MO-LR is the capability of the mobile station to obtain its own geographical location, or have its own geographic location transferred to another LCS client.

Positioning architecture and some positioning procedures are described herein, for illustration and not limitation, for LTE. Many parts of the description are similar for all 3GPP networks.

The positioning flow for NI-LR, MT-LR and MO-LR defined for GSM, UMTS and LTE networks are depicted in FIGS. 3, 4 and 5, respectively. For further detail, see 3GPP Technical Specification 23.271, "Functional stage 2 description of Location Services (LCS)," V 9.2.0, December 2009, the disclosure of which is incorporated herein by reference in its entirety. The positioning flow defined in connection with emergency calls (e.g., in FIG. 3) may have a slightly different flow than in a general case for the same request type.

FIG. 3 illustrates the NI-LR procedure used to position a UE at the beginning of an emergency call. The (Visited) Mobile Switching Center (VMSC/MSC) server in the core network will detect an emergency services flag set by the UE and forwarded by the RAN. The VMSC/MSC server will then send a positioning request to the RAN with a specified Quality of Service. The RAN acts upon the request and passes the results back to the VMSC/MSC sever. The VMSC/MSC server will forward the UE position information to the Gateway Mobile Location Center (GMLC). The GMLC will signal the UE position to the LCS client which is the Emergency Center or Public Safety Answer Point (PSAP).

FIG. 4 illustrates the MT-LR procedure used by a Client to locate a UE during a call. The Client sends a positioning request to the GMLC. The GMLC will check with the HLR to verify if location services are allowed for the specific UE and if so, to obtain the address of the serving MSC/SGSN/MME. The GMLC will then send a positioning request to the serving MSC/SGSN/MME. The serving MSC/SGSN/MME forwards the positioning request to the serving RAN. The RAN responds to the serving MSC/SGSN/MME with the UE position. The serving MSC/SGSN/MME forwards the UE position to the GMLC. The GMLC forwards the UE position to the requesting Client.

FIG. 5 illustrates the MO-LR procedure used by a Client to request its own location from the network. The UE sends a service request through the RAN that is recognized by the serving SGSN/MME. The serving SGSN/MME sends a positioning request to the RAN. The RAN responds to the serving SGSN/MME with the UE position. The serving SGSN/MME forwards the UE position to the UE and optionally, to an LCS Client that was specified in the UE's service request.

FIG. 6 shows the architecture for positioning of a UE with E-UTRAN access, where E-SMLC and SLP are the control-plane positioning node and the SUPL entity responsible for positioning over the user plane, respectively. In FIG. 6, the positioning session is always invoked by the MME, which may either decide to initiate some location service on behalf of a particular target UE (e.g., for an IMS emergency call from the UE), or may receive a request from another entity, such as: the UE at the NAS level; some entity in the EPC (e.g. GMLC); or a radio node (e.g., eNodeB). Two positioning protocols are defined for positioning procedures in E-UTRAN: the LTE Positioning Protocol (LPP) and the LPP Annex (LPPa).

LPP is a point-to-point protocol used between a location server and a target device in order to position the target device using position-related measurements obtained by one or more reference sources. For LPP messages, a server could, for example, be an E-SMLC in the control plane or an SLP in the user-plane, while a target could be a UE or SET in the control and user planes, respectively. LPP uses RRC as a transport over the Uu interface between the UE and the E-SMLC, S1AP over S1 and the SLs interface between the eNodeB and the eSMLC. The following transactions have been specified for LPP: capability transfer procedure (request/provide messages); assistance data transfer procedure (request/provide messages); and location information transfer (request/provide messages).

The LTE Positioning Protocol Annex (LPPa) is a protocol between the eNodeB and the E-SMLC which conducts the LPPa Location Information Transfer procedures for positioning-related information and LPPa Management procedures not specifically related to LCS.

Signaling service between E-UTRAN and EPC is provided over the S1 interface by means of the S1 Application Protocol (S1AP). The S1 interface between the eNodeB and the MME is called S1-MME and is utilized in control-plane positioning solutions (see FIG. 6). The SLs interface is standardized between the MME and the eSMLC with the LCS-AP protocol operating over the interface. The S1 interface between the eNodeB and the Serving GW is called S1-U and it is utilized in user-plane positioning solutions (not shown in FIG. 6).

The 3GPP specification TS 36.413, V 9.0.0, "Evolved Universal Terrestrial Radio Access Network (E-UTRAN); S1 Application Protocol (S1AP)". September 2009, the disclosure of which is incorporated herein by reference in its entirety, defines the following location-related procedures for S1AP:

Location Reporting Control, which allows the MME to request the eNodeB to report the current UE location, with the message LOCATION REPORTING CONTROL;

Location Report, by which the eNodeB provides the UE's current location to the MME by using the message LOCATION REPORT; and Location Report Failure Indication, by which the eNodeB informs the MME that a Location Reporting Control procedure has failed, with the message LOCATION REPORT FAILURE INDICATION.

The positioning result, i.e., the estimated position, is reported back to the entity which generated the positioning request (e.g., UE, BS, etc.). In the prior art solutions, the position is reported following one of the seven shapes defined in 3GPP specification TS 23.032, "Universal Geographical Area Description (GAD)," the disclosure of which is incorporated herein by reference in its entirety. These formats, referred to herein as "3GPP positioning formats," are common for all 3GPP/3GPP2-compliant networks (e.g., GSM, UMTS, and LTE). The particular format used depends on the positioning method and on the reporting capabilities at the receiving end. The reporting formats are explained in greater detail below.

Methods for converting between the 3GPP positioning formats have also been proposed, for example, by T. Wigren, M. Anderson, and A. Kangas, in the paper, "Emergency call delivery standards impair cellular positioning accuracy," published in the Proceeding of IEEE ICC 2010, Cape Town, South Africa, May, 2010, the disclosure of which is incorporated herein by reference in its entirety. One of the reasons for the format conversion is the fact that the standards used in the USA for emergency call delivery support only the ellipsoid point with uncertainty circle format when delivering the calculated position to the Public Safety Answer Point (PSAP).

In cdma2000, the location is reported following the WGS-84 reference ellipsoid format—an ellipsoid point, optionally with uncertainty circle or uncertainty ellipse, associated with one of the pre-defined confidence levels. The WGS-84 is also the reporting format for IEEE 802.x wireless networks (e.g., 802.11 or 802.16).

Polygon: the polygon format is described by a list of 3-15 latitude, longitude corners, encoded in WGS 84 coordinates. The polygon format does not carry confidence information, the confidence being defined as the probability that the positioned entity is actually located in the reported geographical region. This format may be obtained by application of cell ID positioning in LTE.

Ellipsoid arc: The ellipsoid arc is described by a center point (eNodeB antenna position), encoded as latitude, longitude in WGS 84 coordinates. Furthermore, the format contains an inner radius of an arc, a thickness of the arc, as well as the offset angle (clockwise from north) and the included angle (opening angle). Together, these parameters define a circular sector, with a thickness and with left and right angles. The ellipsoid arc does carry confidence information. This format is, for example, produced by cell ID+TA positioning in LTE.

Ellipsoid point: the ellipsoid point format is described by a center point, encoded as latitude, longitude in WGS 84 coordinates. The format neither carries uncertainty, nor confidence information.

Ellipsoid point with uncertainty circle: The ellipsoid point with uncertainty circle format consists of a center point, encoded as latitude, longitude in WGS-84 coordinates, in combination with a radial uncertainty radius. The format does not carry confidence information.

Ellipsoid point with uncertainty ellipse: The ellipsoid point with uncertainty ellipse format consists of a center point, encoded as latitude, longitude in WGS-84 coordinates. The uncertainty ellipse is encoded as a semi-major axis, a semi-minor axis, and an angle relative to north, counted clockwise from the semi-major axis. The format carries confidence information. This format is typically produced by OTDOA and A-GPS positioning in LTE.

Ellipsoid point with altitude: The ellipsoid point with altitude format is encoded as an ellipsoid point, together with an encoded altitude. The format neither carries uncertainty, nor confidence information.

Ellipsoid point with altitude and uncertainty ellipsoid: This is the format commonly received from A-GPS capable terminals. It consists of an ellipsoid point with altitude and an uncertainty ellipsoid, the latter encoded with a semi-major axis, a semi-minor axis, an angle relative to north, counted clockwise from the semi-major axis, together with an uncertainty altitude. The format carries confidence information.

With the exception, described above, of attempts by IETF to allow for using the civic address information in connection to emergency call routing, civic address information in conventional networks is not used for positioning and location services. In particular, in 3GPP or 3GPP2 networks, there is no concept of using the civic address information in any way for the positioning purpose.

SUMMARY

According to one or more embodiments disclosed and claimed herein, positioning and location services are provided in a wireless communication network using civic address information. The civic address information may comprise a data structure including textual Information Elements such as apartment or office number, street number, street name, city, state, postal code, and the like. A positioning method is defined comprising performing a civic address lookup to obtain a location in civic address format for an identified node, based upon information received from the identified node's serving node (or other associated node) and neighbor nodes. The civic address lookup may comprise acquiring the location information from local memory containing provisioned addresses, from a local database, or from a civic address information database external to the node or the wireless network. Signaling is defined to request the civic address positioning method; to request/communicate the capability of dealing with civic addresses used for positioning; to indicate a failure associated with civic address positioning (e.g., a failure to provide the response in the requested civic address format, or failure to run the civic address positioning method); to indicate the failure cause; and/or to communicate location information using a civic address format. Location information may be translated between a civic address format and a conventional 3GPP positioning format. Embodiments of the civic address positioning method and associated signaling are particularly advantageous in indoor environments, where conventional positioning methods fare poorly or fail altogether.

One embodiment relates to a method of providing location services in a wireless communication network. A positioning request is received from a requesting network node, requesting the geographic location of an identified network node. Location information associated with the identified node is obtained in a civic address format. A positioning response is transmitted to the requesting network node.

Another embodiment relates to a method of providing location services in a wireless communication network, in at least a civic address format. A positioning request is received from a requesting network node, requesting the geographic location of an identified network node. Location information associated with the identified node is obtained. A positioning response is transmitted to the requesting node, the response including the location of the identified node in at least a civic address format.

Still another embodiment relates to a method of translating a position estimate between a 3GPP positioning format and a civil address format. A position estimate is received in one of a 3GPP positioning format and a civic address format. The position estimate is converted to the other of the 3GPP positioning format and the civic address format, and the position estimate is transmitted in the translated format.

Yet another embodiment relates to a method of estimating the position of an identified node in a wireless communication network. A positioning request for the geographic location of an identified network node is received. Information regarding the serving node or an associated gateway node for the identified node to be positioned, and neighboring nodes, is received. The received information is analyzed. Based on the received information, a position estimate for the identified node is determined, the estimate expressed in civic address format. The position estimate for the identified node is reported.

Yet another embodiment relates to a hybrid method of providing location services in a wireless communication network. A positioning request is received from a requesting network node, requesting the geographic location of an identified network node. First location information associated with the identified network node is obtained in a civic address format. Second location information associated with the identified network node, not in civic address format, is obtained. The second location information is used to improve the accuracy of the first location information. The improved location information is transmitted to the requesting network node.

Yet another embodiment relates to a node operative in a wireless communication network and having positioning functionality. The node includes a communication interface operative to receive a positioning request from a network node, the positioning request requesting the position of an identified network node, and further operative to transmit a response including a position estimate of the identified node. The node further includes a positioning function operative to estimate a position associated with the identified network node, the position being in a civic address format.

Yet another embodiment relates to a node operative in a wireless communication network and having position information translation functionality. The node includes a communication interface operative to receive a position estimate in one of a 3GPP positioning format and a civil address format. The node also includes a translation function operative to convert the position estimate to the other of the 3GPP positioning format and the civil address format. The communication interface is further operative to transmit the position estimate in the translated format.

DETAILED DESCRIPTION

Figure 1:
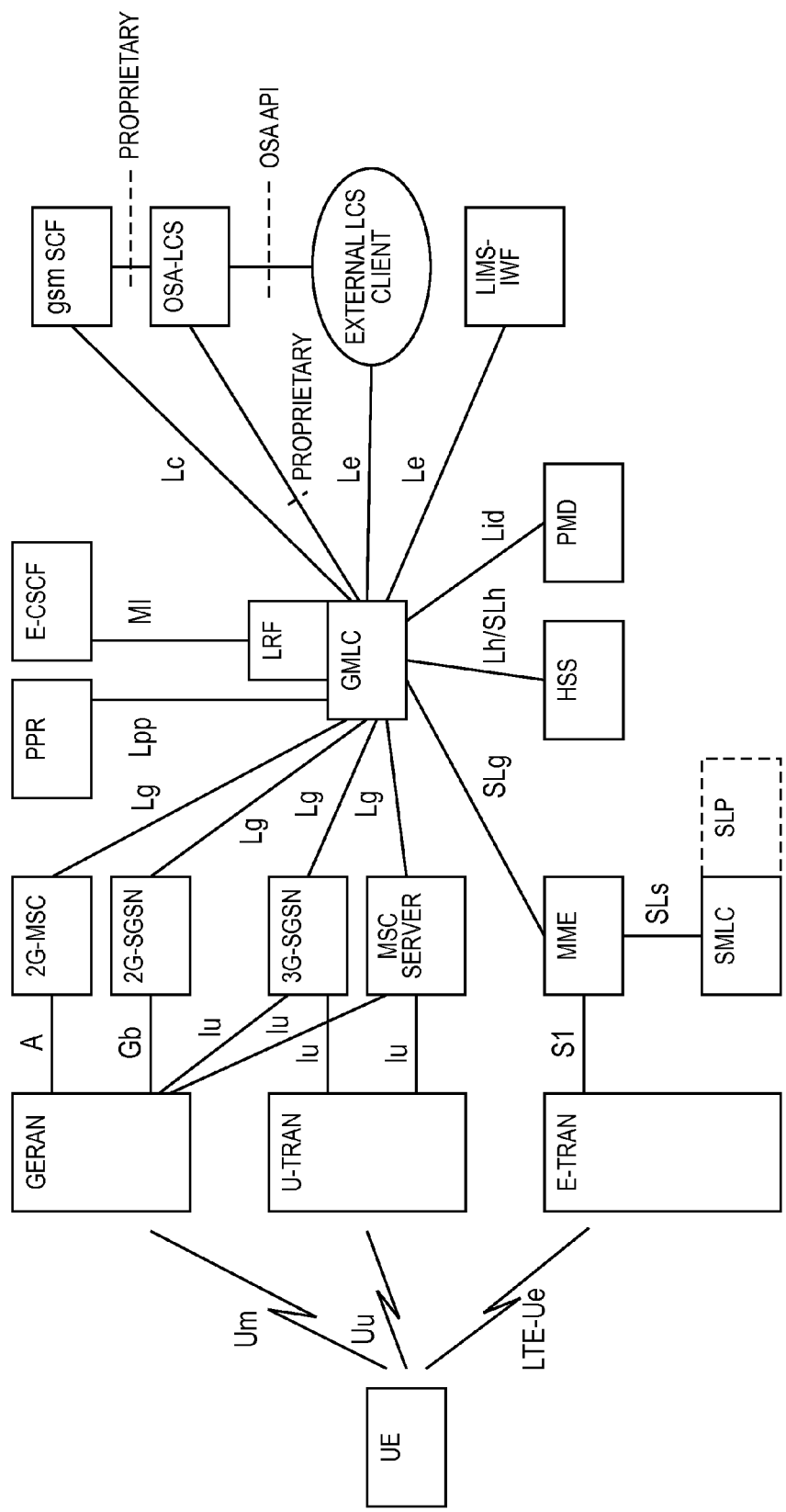
FIG. 1 is a functional block diagram depicting the provision of Location Services in prior art wireless communication networks.
Figure 2:
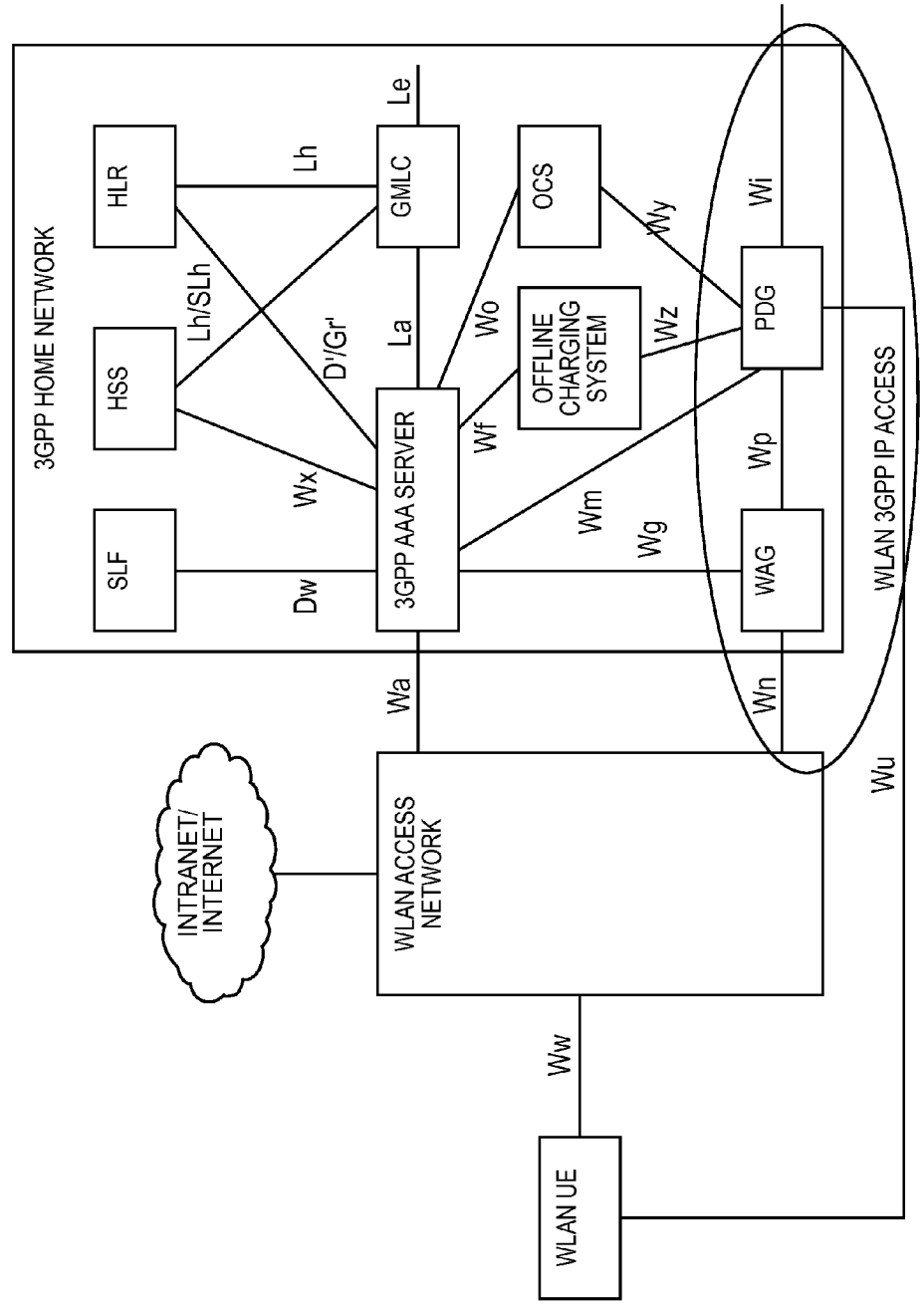
FIG. 2 is a functional block diagram depicting the provision of Location Services in prior art wireless local area networks.
Figure 3:
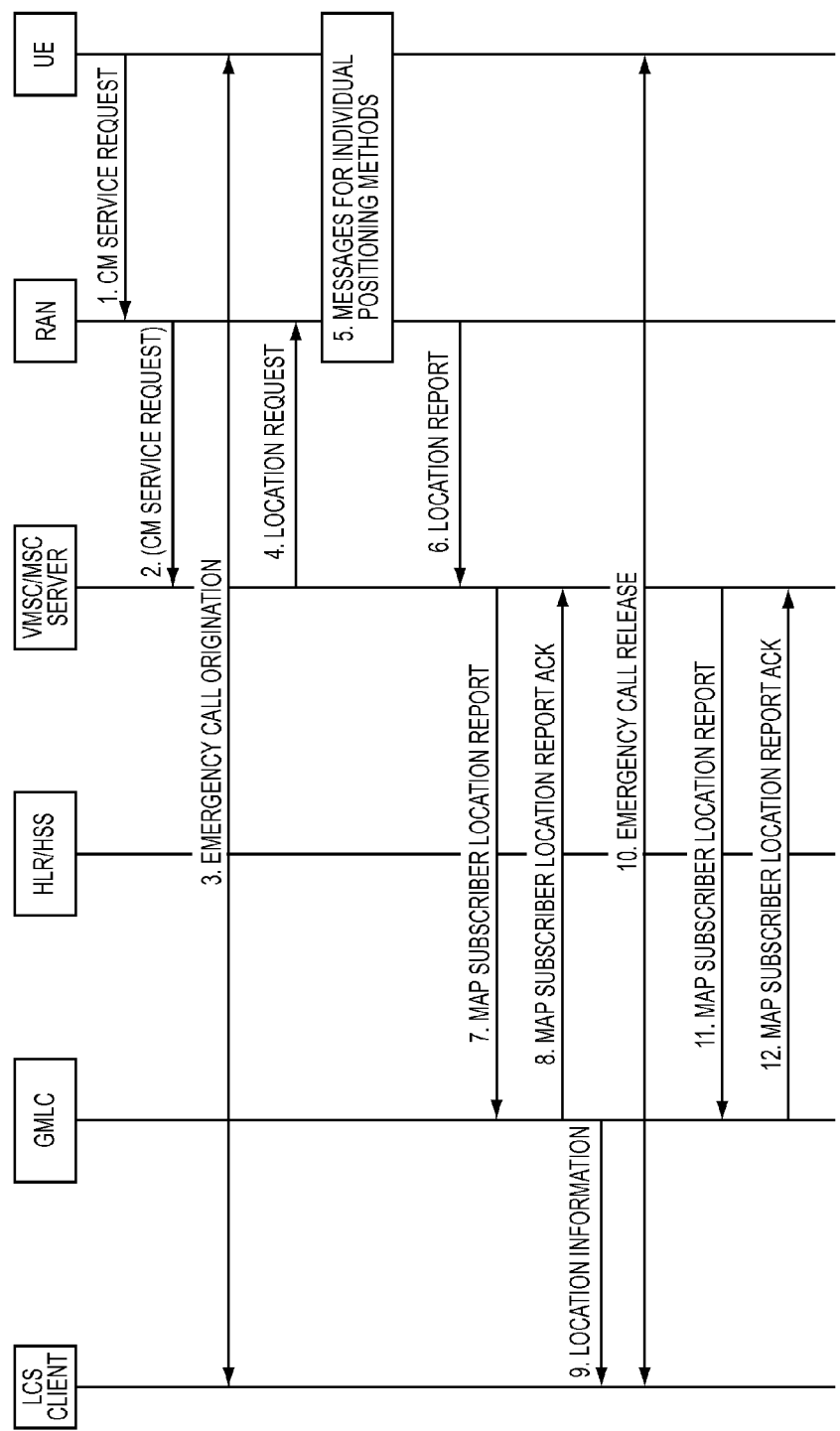
FIG. 3 is a call signaling diagram for a prior art network-induced location request (NI-LR).
Figure 4:
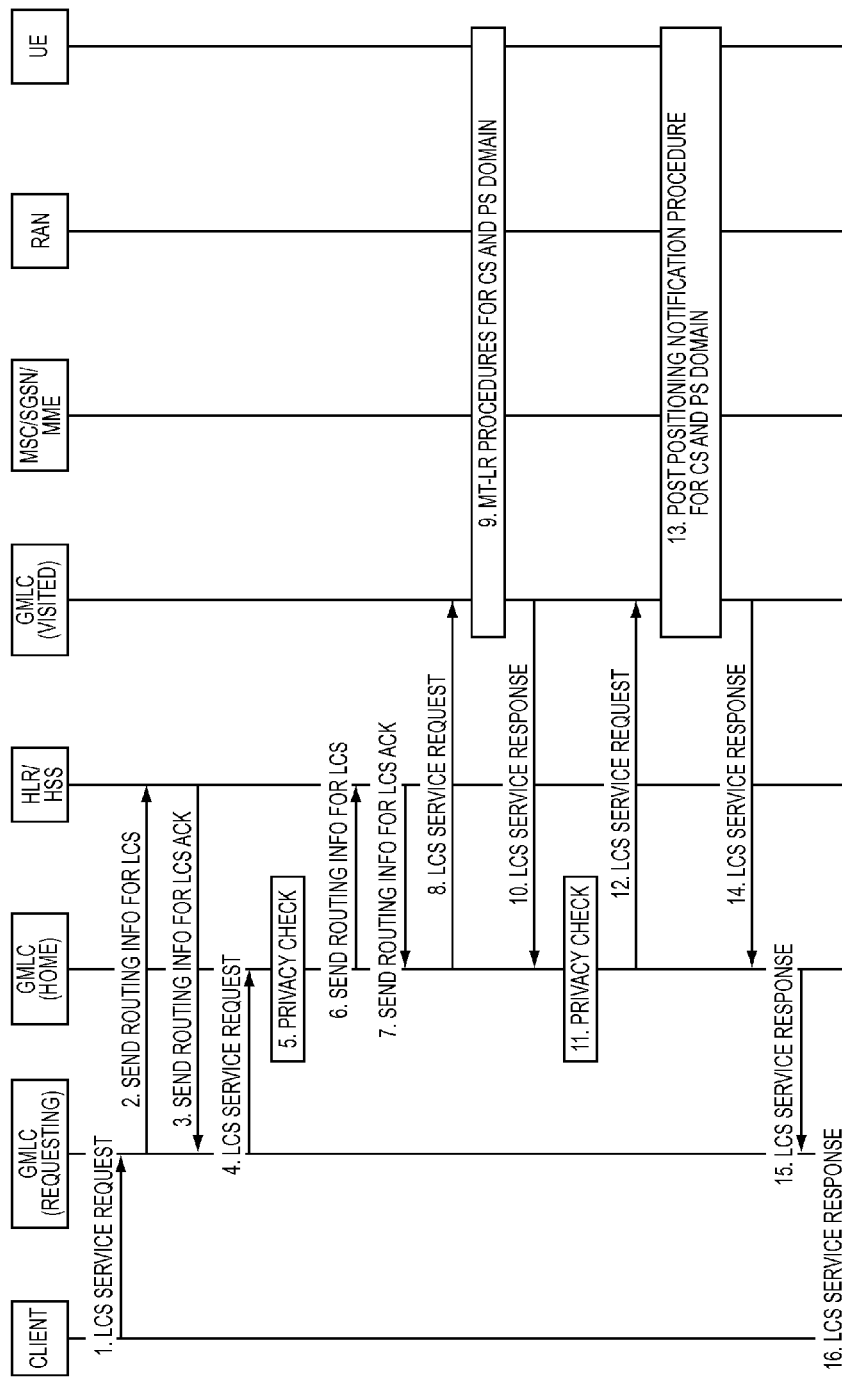
FIG. 4 is a call signaling diagram for a prior art mobile-terminated location request (MT-LR).
Figure 5:
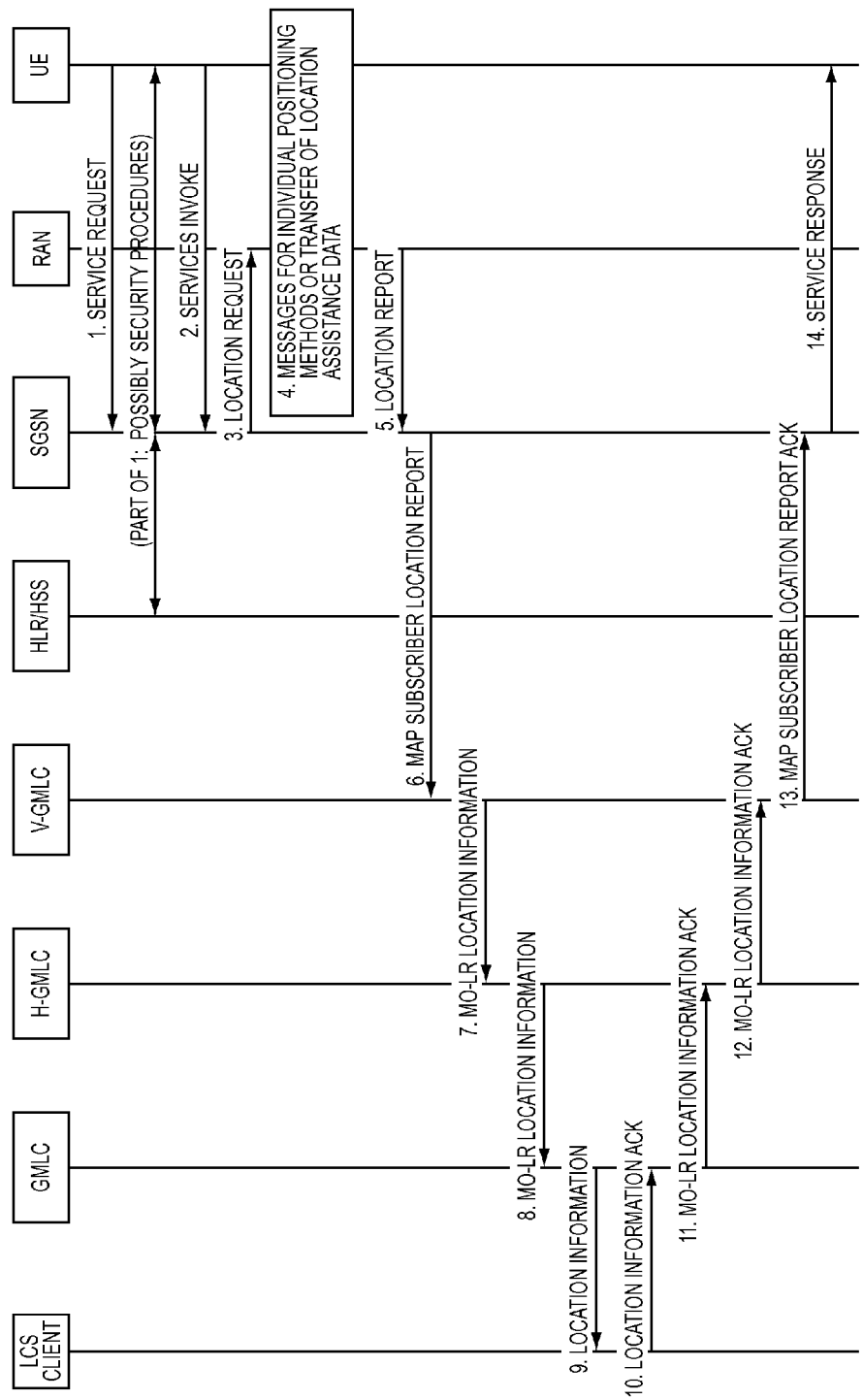
FIG. 5 is a call signaling diagram for a prior art mobile-originated location request (MO-LR).
Figure 6:
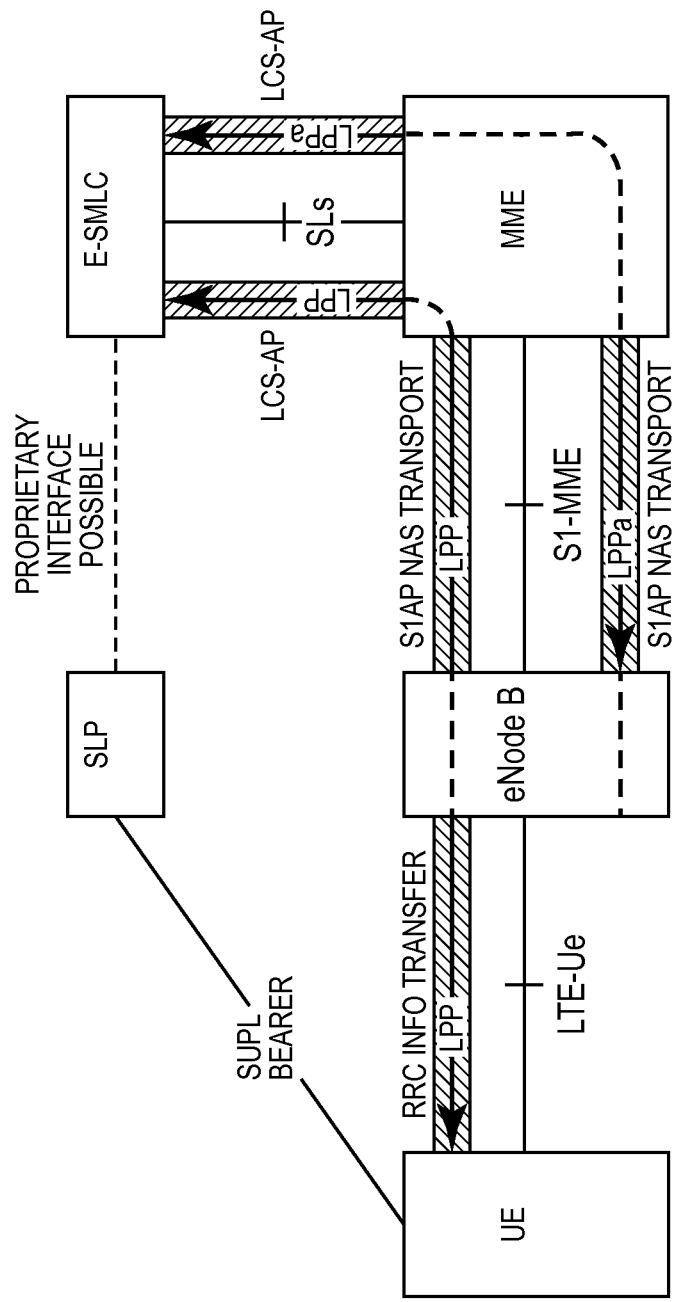
FIG. 6 is a functional block diagram depicting the positioning architecture and protocols in a prior art E-UTRAN network.

To allow for the use of civic address information for positioning and location services, at least the following must be defined:

Formalized address information representation;

Signaling support for the involved interfaces and protocols; and

Methods and regulations on how to use the information and relate it to other positioning reporting formats.

Assume a node X needs to be positioned, where the node comprises a terminal (e.g., a fixed terminal or a mobile UE) or a radio node (e.g., a base station or a beaconing device or sensor). The serving node of X (or an associated node, such as a gateway, if X has no serving node) and/or at least one of its neighbor nodes has the civic address information of its own location (e.g., the street address, or the like). The civic address information may be manually configured, received from the network, or obtained by another method described herein. Alternatively, the network has the civic address information of node X's serving node (or other associated node) or at least one of its neighbor nodes. The information can reside in a network node which may or may not be a part of the usual positioning chain, depending on the storage organization and the way the information is obtained (for example, a Home NodeB may need to register its address in the network to obtain permission to serve macro users).

In prior art positioning solutions, the civic address information cannot be signalled to the node X in response to a positioning request. In fact, it cannot be even described by any standardized format as a positioning result. Furthermore, the civic address information cannot be translated to a geographical location, followed by reporting to the node X.

Prior art positioning solutions fail to exploit the available address information, for example when standard positioning methods outdoors fail or are too inaccurate. For example, OTDOA may fail due to detection of too few neighbor nodes, as is typical in rural areas. As another example; CID must rely on a cell description that covers a large geographical area. Prior art positioning solutions further fail to exploit the available address information, for example when standard positioning methods indoors fail or are too inaccurate. This may occur when A-GPS fails indoors due to too poor signal strength. Another example is if the node X is a home eNodeB, WiFi node, or a beaconing device, it may not be equipped with advanced positioning technology, meaning that it has to resort to cell ID or another fallback method. The indoor case is particularly important, since the majority of all cellphone calls are now placed indoors.

Hybridizing different positioning methods and various types of measurements and positioning-related information may significantly benefit positioning. The civic address information has a particularly strong advantage since it directly relates to a position and is independent, for example, of the propagation environment.

According to embodiments described herein, available civic address information is exploited for positioning by reporting the address string as the positioning result. A generic information element for the civic address information is defined, and signaling for communicating the civic address information among different nodes involved in the positioning communication chain is described. Methods are described for mapping/conversion between a civic address format and conventional 3GPP positioning formats, while accounting for the uncertainty and confidence information. Such conversion or translation may occur, in general, in any network node. In some embodiments, the conversion is applied prior to communicating the address information, to exploit the available signaling means over certain interfaces. In some embodiments, methods are provided for hybridizing the civic address information with other positioning measurements, and exploiting this information for hybrid positioning. Existing positioning methods may be enhanced with civic address information, and new positioning methods based on the civic address information are described.

While the detailed descriptions of embodiments of the present invention are presented in the context of LTE, the invention is not so limited. Those of skill in the art will readily recognize that embodiments of the present invention may be advantageously adapted to a wide variety of wireless communication systems, given the teachings of the present disclosure.

The civic address information identifies the physical geographical location of a network node, described with at least some of the conventional fields such as street, city, postal code, etc. One embodiment of the address information format is depicted in Table 1, where in practice each field will typically also be associated with a short name or label. Other formats of representing the address information can, of course, also be envisioned. For multi-network compatibility, the address message format in 3GPP or 3GPP2 may also follow, for example, the format defined by IETF, or have a conversion interface to it.

TABLE 1

Civic Address Information Format, according to one embodiment

| Field Description | Field Type | Field Presence (optional/ mandatory) | Default value |
|---|---|---|---|
| Apartment/office/suite number/floor number | 16 alpha/numeric | Optional | No data |
| Street number | 16 alpha/numeric | Optional | No data |
| Street name | 32 alpha/numeric | Optional | No data |
| City name | 32 alpha/numeric | Optional | No data |
| State/province name | 32 alpha/numeric | Optional | No data |
| Postal code | 16 alpha/numeric | Optional | No data |
| Road | 8 alpha/numeric | Optional | No data |
| Comment (for example: "northeast corner outside Bubba conference room") | 64 alpha/numeric | Optional | No data |

In Table 1, at least some of the Information Elements defining the civic address format are hierarchical, with "lower" levels of hierarchy defining location with greater specificity, and "higher" level of hierarchy defining location more generally, or with greater uncertainty. For example, a city is a more specific location than a state; a street name is more specific than a city; a street number with the street name is more specific still; etc. In this sense, the hierarchical level of an IE in the civic address format inherently carries uncertainty information. In one embodiment, a positioning request may be tailored to a specific level of accuracy by specifying the IEs, or the highest hierarchical level IE, to be provided. This allows applications to tailor positioning requests to the level of accuracy desired, and reduces unnecessary signaling since the full civic address (i.e., any hierarchical level higher than that requested) need not be transmitted, or propagated through the network.

A related concept is confidence. Regardless of the level of certainty of a location reported in civic address format—that is, e.g., the hierarchical level of the most specific IE reported—a node may additionally report some indication of the confidence of accuracy or veracity of that information. In one embodiment, a confidence field is an additional (optional) field for each IE (i.e., an additional column in Table 1). As a representative and non-limiting example, a node may report location in civic address format with a City Name IE having a 100% confidence, and a Street Name IE having a 95% confidence, but with a Street Number IE having only a 50% confidence (particularly if the node being positioned is a mobile UE moving along the street). Of course, a numeric value for confidence, representing a percentage, is only one possible mode of reporting confidence; in general, the confidence of a location (or individual IE) may be reported in a number of ways.

Note that, as the above example illustrates, unlike many conventional 3GPP positioning formats that report a single confidence value associated with a location, the civic address format enables and supports a greater granularity of confidence reporting. While a single confidence value may certainly be associated with an overall location report, one or more individual IEs within the civic address format may be independently assigned confidence values.

Furthermore, both uncertainty and confidence values, if present, may be translated or converted as location information is translated between conventional 3GPP positioning formats and civic address formats (in both directions). Such translation may occur at any node in the network.

In Table 1, all fields are optional, so that national/local PSAPs and wireless operators can mutually decide which fields they do or do not want to use, although other solutions are also possible. In general, the list of the required fields has to be the same for all PSAPs in a country/region/province/state because the SMLC has no idea of the requirements of a specific PSAP or to which PSAPs a given positioning result may be sent. In one embodiment, the fields may be turned on/off via parameters in the positioning node.

If a local PSAP organization dictates that some fields (i.e., street number, street name, postal code) must be used, the local positioning node might not have data for some of those fields. In this case, "no data," or other label, as the default content may be used to indicate that the requested data are not available.

Network nodes that may originally maintain civic address information, include: radio nodes (e.g., Home NodeB, pico BS, relay, beaconing device or sensor, and WIFI nodes); positioning nodes (e.g., E-SMLC which either includes or has an interface to an SPC function as defined by OMA SUPL); terminal nodes (e.g., fixed wireless terminals); and a terminal or UE that may then help with positioning of another terminal, UE or a radio node (e.g., Home Node B, relay, etc.).

Support for signaling of the address information along the positioning chain includes signaling operative to: signal the address information; request the address information; indicate the capability of dealing with the address information; and indicate a failure of the positioning and/or the cause of such failure. As used herein, signaling between, e.g., node A and node B includes signaling via direct or indirect (e.g., higher-layer protocol) links.

For 3GPP networks, signaling of civic address information is needed: between the MSC/SGSN/MME and the UE or radio node, including from the MSC/SGSN/MME to the target UE or the target radio node (for network-based or network-assisted positioning) and from the UE or the radio node to the MSC/SGSN/MME (e.g., in case of UE-based positioning or to support AECID); between the RAN and the VMSC/MSC/SGSN/MME; between the VMSC/MSC/SGSN/MME and the GMLC; between two GMLCs (e.g., from visited GMLC to home GMLC or from home GMLC to other requesting GMLC); from the GMLC to the Client; and between MME and E-SMLC/SLP. More generally, the civic address information signaling is required: between the control plane and the user plane; from the UE or the radio node to either another UE or another radio node (to cover UE-to-UE communication or signaling in ad hoc networks).

The positioning procedures are typically defined as bidirectional, so both solicited and unsolicited ways of providing the civic address information are possible. This means that the request for the civic address information may be sent along most of the links listed above. In one embodiment, the civic address information is an optional field (e.g., an indicator) in a general positioning request.

The indicator may be included before the positioning session is setup, e.g., by the user application over the NAS signaling. Alternatively, the civic address information as a positioning result can be requested after the positioning session has been set up, e.g., over LPP/LPPa protocols.

If supporting the civic address information for positioning becomes an optional feature, not all terminals and not all network nodes will necessarily implement this functionality. Whether the feature is supported can be determined by the capability exchange procedures between the target (e.g., the terminal or a radio node) and the server, which in LTE may be realized, for example, over the LPP protocol and/or LSC-AP protocol.

When the address information is requested, but the positioning server for some reason has not been able to provide the positioning result in this format (e.g., no information in the database), an indicator for the failure and optionally for the failure reason may be sent to the requesting node. The indicators are then to be sent together with the positioning report over the corresponding interfaces and protocols.

Methods are described herein to convert civic address information, such as that depicted in Table 1, to the 3GPP positioning formats such as the standardized geometrical shapes, without using any position-related measurements. In each case, the reverse conversion is straightforward using similar methodology.

The mapping/conversion methods disclosed herein may, in general, be implemented in any network node, including UEs, fixed wireless terminals, radio nodes such as a radio base station or a beacon device or sensor, core network nodes such as a positioning node, and the like. Depending on where the conversion takes place and whether the non-converted information needs to be signaled over some interfaces or not, the civic address information signaling defined above may be necessary until the conversion to a 3GPP positioning format occurs. If the conversion is possible in the node that needs to communicate the civic address information, the new signaling may be avoided. Otherwise, the new signaling is necessary for the interfaces over which the text-based civic address information shall be signaled.

In one embodiment of the invention, the textual civic address information is signaled together with the geographical coordinates, when the latter are available, or without them. This also means that using the disclosed mapping/conversion methods does not preclude signaling the original address information, even after the mapping/conversion has taken place, which may be useful when the database is not available (i.e., not maintained or not accessible) everywhere in the network. In another embodiment, including both the civic address information and the geographical position, or either of the two, is configurable (e.g., in the positioning node).

In one embodiment, the civic address information in Table 1 is augmented with one row for latitude and one row for longitude, and optionally with one row for altitude. This embodiment provides an "ellipsoid point" format that can be used for reporting. The latitude, longitude, and altitude information can be obtained in numerous ways. In one embodiment, it is obtained by manual configuration by the user or operator. In another embodiment, it is obtained by acquiring the information via cross-layer communication in the same device or node (e.g., from other applications or locally maintained databases). In still another embodiment, it is obtained by acquiring the information from other devices or nodes (e.g., from a GPS device in the same car, via wireless or wired links, which is feasible since handheld and car mounted GPS devices are very common). In yet another embodiment, it is obtained by receiving this information from the same network or some other monitored or sensed network (e.g., WiFi). To ensure 3GPP compliance, software may be needed for reading in the latitudes, longitudes, and altitudes and for encoding these according to the 3GPP standard.

In order to follow the standard positioning procedures while requesting the civic address information, a new instance of the positioning request from the Client to the positioning node (e.g., E-SMLC) and the measurement request to the positioned wireless terminal (e.g., a UE, a fixed wireless terminal or WLAN terminal) or a radio node (e.g., home eNodeB, pico base station, beaconing device, etc.) need to be standardized—this being the case since positioning requests in the prior art ask for measurements or positions using a specific method like A-GPS or OTDOA. The new request instances may, for example, contain an indicator for inclusion of the textual civic address information, which may or may not be associated with the standardized positioning methods, or may be associated with a new positioning method. For the same reason, a new instance of the measurement response (using "ellipsoid point") needs to be standardized and implemented. This is preferably done at least for the LTE system and/or its successors, e.g. LTE-Advanced. Note that this standard change is limited to, at most, the signaling between the wireless terminal, the positioning node (e.g., E-SMLC) and Core Network (CN), while the signaling at higher layers and signaling beyond the CN is not affected. The invention, however, is not limited to LTE and can also be realized in other 3GPP networks, e.g. UMTS, GSM, or non-3GPP networks, e.g. cdma2000, IEEE 802.16, IEEE 802.11 (given that the reporting formats are compatible or there exists an interworking interface).

In another embodiment, Table 1 is augmented with another row, the user configured "radius of coverage," describing uncertainty. Together with the latitude and longitude, this defines the standardized 3GPP shape "ellipsoid point with uncertainty circle." The rest of the embodiment parallels the "ellipsoid point" embodiment described above, with the exception that two reporting shapes can be used with this embodiment, i.e., "ellipsoid point" and "ellipsoid point with uncertainty circle."

The "radius of coverage" information may be manually configured or polled from a local database where the address is associated with the area size S (e.g., the "radius of coverage" is found as $R=\sqrt{S/\pi}$).

In one embodiment, the latitude, longitude, and uncertainty radius are computed using a geographic information system (GIS), similar to those behind the mapping systems of commercial car mounted and handheld GPS devices. This can be done with prior art techniques that tie addresses to the measured position in such systems (required for plotting the position on the map together with street names). The GIS system and the associated computations may be located either off line—followed by configuration of the transforming node (preferably the E-SMLC or an associated server) with entities like the transformation tables in the above-described embodiments. Alternatively, the GIS system and the computation software may be integrated in the transforming node (preferably the E-SMLC or an associated server). When a wireless terminal is positioned, using the extended signaling described herein (using a new instance of the positioning request for "text based positioning"), the text string is reported to the transformation node where it is transformed to one of "ellipsoid point" or "ellipsoid point with uncertainty circle."

In one embodiment, in case e.g. only a street (no number) is available, the transformation logic can be performed by the AECID algorithm and the GIS transforming system together. By modifying the GIS system to compute a number of geographical latitude/longitudes in the geographical area covered by the street, a number of artificial reference positions are created for the AECID algorithm. This algorithm can then use these to automatically compute a polygon that describes the geographical extension of the street. This process is described by T. Wigren, in the paper, "Adaptive enhanced cell ID fingerprinting localization by clustering of precise position measurements," published in the IEEE Transactions on Vehicular Technology, vol. 56, no. 5, pp 3199-3209, 2007, the disclosure of which is incorporated herein by reference in its entirely. The end result in this case will be a table, similar to Table 1, that associates a street name with the 3GPP positioning format "Polygon." This format can be reported with conventional methods in the LTE system.

There are at least two approaches to representing the civic address information when hybridizing it with other measurements. First, the civic access information may be mapped or converted to the standardized geometrical shapes prior to hybridizing. Alternatively, the civic access information may be utilized as such when hybridizing with other measurements. The choice of the most suitable approach is dictated by the hybrid algorithm implementation.

As exemplified by the "Polygon" embodiment described above, there may be situations where the uncertainty region associated with the position calculated from the text information becomes large. In such cases, it is beneficial to use radio measurements to narrow that uncertainty. Since text position reporting is expected to be particularly advantageous to use indoors, radio measurements that work indoors are preferably used. Examples include timing advance measurements in LTE.

Figure 7:
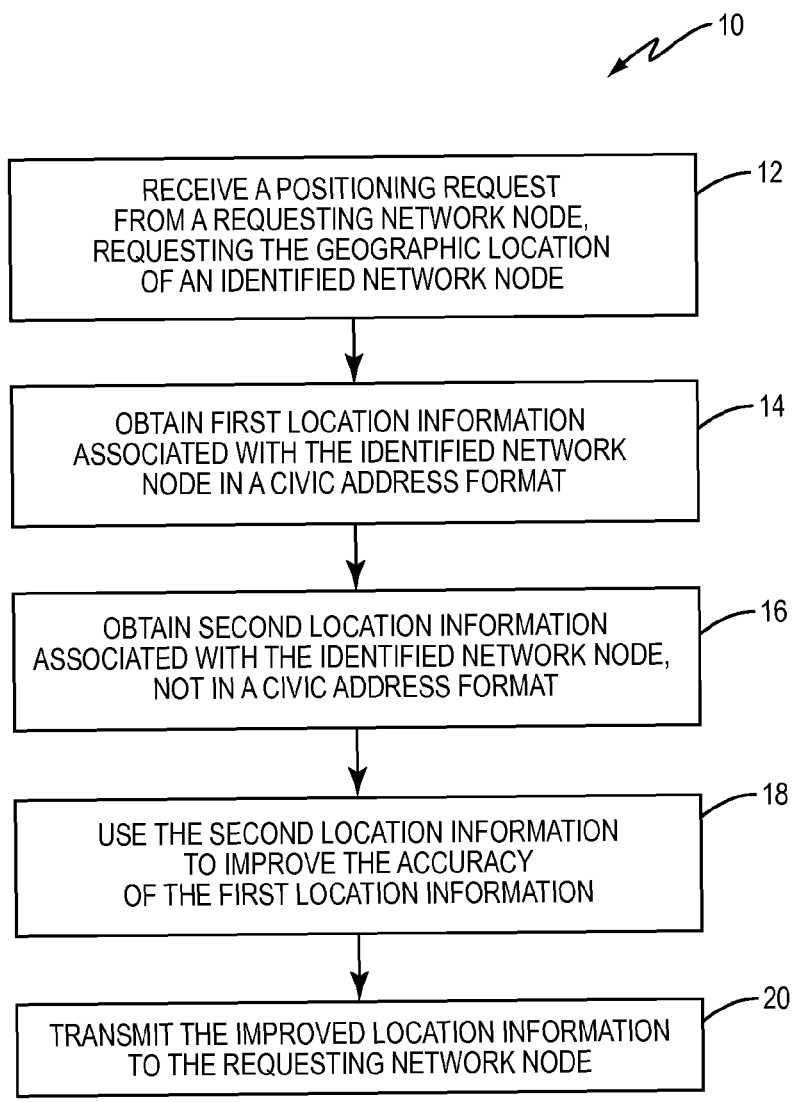
FIG. 7 is a flow diagram of a hybrid method of positioning an identified node using both civic address format and 3GPP positioning format.

FIG. 7 depicts a hybrid method 10 of improving a position estimate by using both civic address format location information and either location information or network measurements in conventional 3GPP positioning formats (or the components thereof). The method 10 may be performed at any appropriate network node, such as a GMLC, eNodeB, or the like. A positioning request is received (block 12), requesting the location of an identified network node, such as a UE. First location information associated with the identified network node is obtained, the location information being in a civic address format (block 14). This may comprise, for example, a street name. As described above, the street name may be translated by a GIS system into a polygon of latitude/longitude points. The polygon may cover a large area, giving rise to a large degree of uncertainty regarding the location of the identified node to be positioned.

Second location information, not in a civic address format, is obtained (block 16). The term "second location information" is to be broadly construed. In one embodiment, the second location information is a location, obtained by a conventional positioning method, and describing the geographical location of the identified node in a 3GPP positioning format. In another embodiment, the second location information comprises location-related information obtained by performing (e.g., by another node) one or more wireless communication network measurements. These measurements may yield second location information expressed as components of one or more 3GPP positioning formats (e.g., longitude, latitude). Alternatively, the measurements may yield second location information as simply measurements of network properties or parameters. For example, Timing Advance (TA) measurements may be performed (e.g., by a UE's serving eNodeB), and the results reported to the positioning node.

The second location information improves the accuracy of the first location information (block 18). For example, where the second location information comprises a position estimate in 3GPP positioning format, it may locate the identified node more precisely within the polygon obtained from civic address positioning. As another example, where the second location information comprises range information provided by a TA measurement, the polygon may be combined with the range information (e.g., eNodeB to UE), to narrow the uncertainty of the UE's location within the polygon.

This combination can be performed with prior art algorithms described, for example, by T. Wigren and J. Wennervirta, in the paper, "RTT positioning in WCDMA," published in the Proceedings of the 5th international conference on wireless and mobile communication," Cannes/La Bocca, France, pp. 303-308, Aug. 23-29, 2009, the disclosure of which is incorporated herein by reference in its entirety. The result would be a geographical region described by the 3GPP "ellipsoid arc" reporting format, and having a greater accuracy than the civic address location alone. The improved location information is transmitted to the requesting network node (block 20), either in the "ellipsoid arc" or other 3GPP positioning format; or in an improved-accuracy civic address format, which may for example include a numbered address on the street, or a range of addresses; or in both formats.

The network measurement embodiment described above is one example of numerous possibilities. For example, one alternative would be to combine the TA and polygon also with angle of arrival measurements. The advantage with such an embodiment would be that angle of arrival information is almost orthogonal to TA information. Unfortunately, angle of arrival information is available quite seldom.

Fingerprinting is a technique based on signal measurements (e.g., received signal strengths), referred to as fingerprints, measured from multiple transmit points and combined into a map where fingerprints from different locations and their combinations are associated with geographical areas. Address information can be utilized to further improve this class of methods by allowing the geographical areas to be described by addresses (which can be of different levels, e.g., office-, street-, block-level, etc.) and the address information can either be in an explicit address message format as, for example, in Table 1, or can be encoded.

If the requested positioning result format is the civic address, then the conversion, and thus possible information loss, may be avoided if the signaling of the address information is possible over the involved interfaces. Otherwise, even when only the 3GPP positioning formats are acceptable for signaling, the address information, when available, may still be used (in an encoded or the explicit format) in the database in association with radio measurements.

The enhancement proposed for fingerprinting-like methods may or may not require new signaling, depending on how the address information is obtained. For example, pattern matching relying on RF maps obtained by site surveying may use an associated address information database which may be internal in the positioning node, and hence no new signaling is required.

In the prior art self-learning positioning method called Adaptive Enhanced Cell ID (Adaptive E-CID, or AECID), which is an enhancement of E-CID, the E-CID measurements are collected and quantized whenever an A-GNSS or OTDOA measurement is performed. The positions are then tagged with the E-CID measurements. The data are grouped into clusters where each cluster shares the same tag. The boundaries of the clusters are described by a polygon, which is hence characterized with the same set of cell IDs and quantized TA and signal strength measurements. In one embodiment, the civic address information, possibly complemented with positions obtained by A-GNSS or OTDOA when either is available, is tagged with the E-CID measurements.

In another embodiment, the address messages received from neighbor cells or neighbor radio devices are considered as measurements by themselves. So, the positions may be tagged with the set of the received civic address information (again, in an encoded or explicit formats), which may complement the cell ID set. Tagging with the set of cell IDs is possible in the prior art. Using the civic address information instead of, or in addition to, the set of cell IDs is more advantageous for several reasons, e.g., in resolving cell ID ambiguity, when listening beacons or relays which may not have own cell IDs or when sensing some other network.

To enable the AECID enhancements as described above, a positioning measurement report shall allow for inclusion of the civic address information, which has a minor impact on standardization (e.g., LPP and LPPa in LTE, depending on the address information source).

Figure 8:
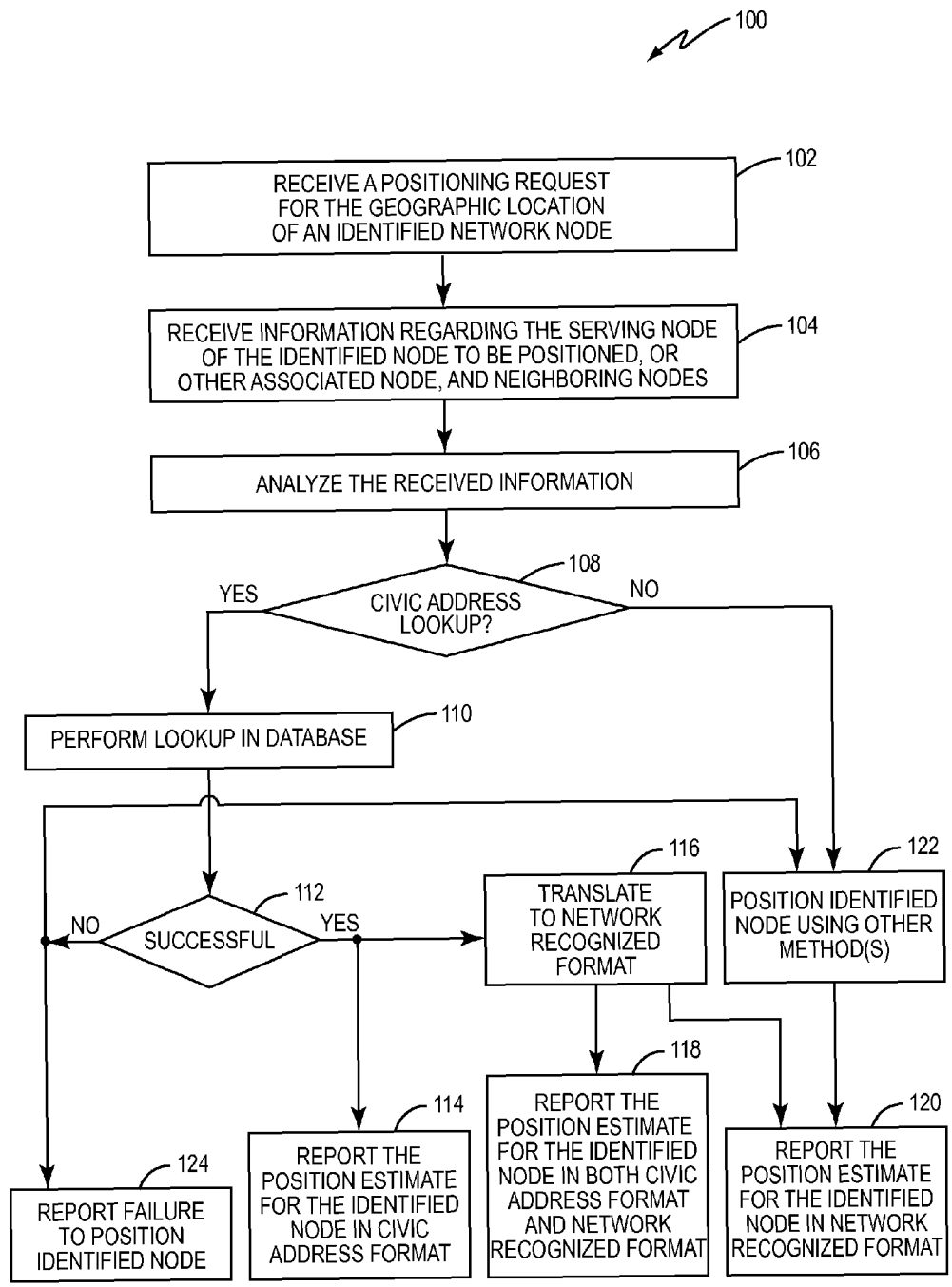
FIG. 8 is a flow diagram of a method of positioning an identified node using civic address format location information.

FIG. 8 depicts a new positioning method 100, according to embodiments of the present invention. The method may be performed in any appropriate network node, such as a GMLC, eNodeB, or the like. A positioning request is received (block 102), requesting the geographic location of an identified network node, such as a UE. In one embodiment, the positioning request may indicate the new positioning method 100 as a preferred or requested positioning method. In another embodiment, alternatively to indicating the required accuracy following the standardized encoding, new accuracy levels (or detail levels) adapted for the civic address information format may be introduced (e.g., corresponding to the apartment/office level, street level, road level, etc.). In one embodiment, the new method 100 is selected as a positioning method in the first, second, or other attempt, depending at least on the requested QoS and response time, as well as the target and the server capabilities. In one embodiment, the new method 100 is the first choice in the positioning method selection logic, at least for emergency calls, while satellite and terrestrial methods are used when the node to be positioned does not qualify for an address lookup.

Information is received regarding the serving node (or other associated node, such as a gateway), neighbor cells, and/or neighbor devices (e.g., UEs, wireless terminals, beacon devices, etc.) of the identified node to be positioned (block 104). The information comprises at least one of: cell ID, device ID or device name, and address information (e.g., rough location). Some or all of this information may be included in the positioning request. Alternatively, the positioning node may query other nodes for this information. The received information is analyzed (block 106). Based on this analysis, a decision is taken whether a civic address lookup shall be utilized to position the requested node (block 108). If so, the lookup is performed (block 110). The civic address lookup may be in local memory, in a local database, or in a remote database, either within or exterior to the wireless communication network (the information exchange with the remote database may be implemented, for example, at the application layer). If the lookup is successful (block 112), a positioning response is then sent to the requesting node.

In one embodiment, if appropriate signaling is implemented, the positioning result in the response is in a civic address format (block 114), such as, e.g., the IEs depicted in Table 1. In another embodiment, the positioning result is translated into one or more 3GPP position formats (block 116), and the positioning response includes both the civic address format and the 3GPP position format (block 118). In still another embodiment, where it is known that the necessary signaling is not implemented, the positioning result is translated (block 116), and only the 3GPP position format is provided in the positioning response (block 120).

If the address lookup is not attempted (block 108), or is attempted and is not successful (block 112) (e.g., missing address information in the database, or the conversion does not meet the requested accuracy requirements), other positioning methods may be attempted (block 122). If successful, these results may be reported (block 120). Alternatively, a positioning response indicating failure may be returned to the requesting node (block 124). The failure response may indicate the fact of failure to position the node, the cause of the failure, or both. The method 100 is particularly suitable for small cells (e.g., Home eNodeB, beacons, pico cells, WiFi access points, fixed wireless access points, etc.) and small radio coverage ranges of the involved nodes and devices.

In one embodiment, the reported address information format is dynamically composed of the available fields. For example, for a car moving along a highway, the speed information could be an indicator for transmitting the road information; the velocity vector information could be used for predicting the movement and intelligently selecting the route.

Figure 9:
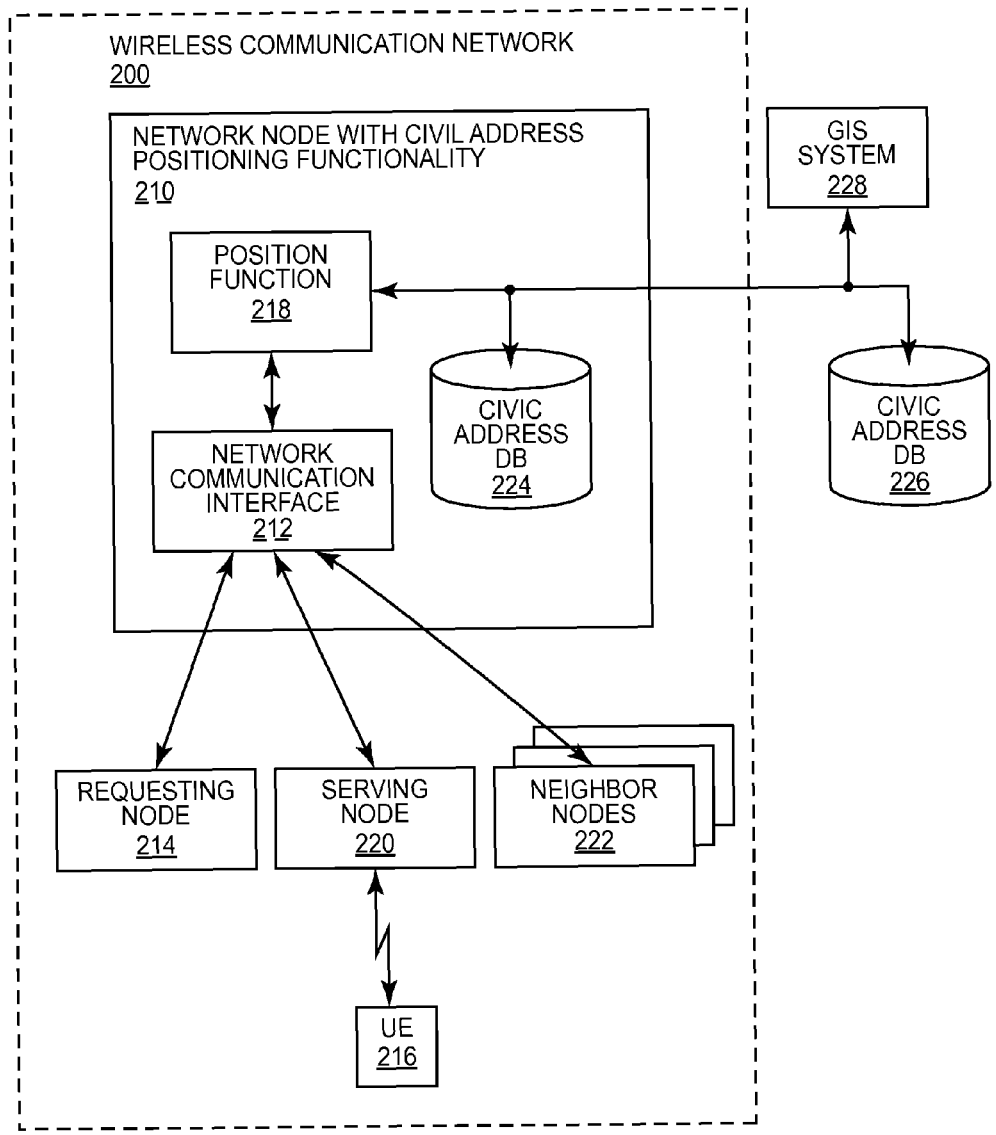
FIG. 9 is a functional block diagram of a network node operative to position an identified node using civic address format location information.

FIG. 9 depicts a wireless communication network 200, including a network node 210 having civic address positioning functionality. The node 210 may comprise a GMLC, eNodeB, MME, UE, or any other network node having the described functionality. The node 210 includes a network communication interface 212 operative to receive a positioning request from a requesting network node 214, to position an identified network node. The requesting node 214 may be the node to be positioned, or the requesting node 214 may request the location of a different network node, such as a UE 216. The positioning request may include an indicator that the requesting node 214 desires the positioning be performed according to the method 100 described above, or that the positioning result be reported in civic address format, or both. The positioning request may further indicate the desired accuracy in terms of the civic address. For example, only the information below (i.e., more specific than) the city or postal code is required, in applications where the identified node moves relatively slowly.

The positioning request is processed by a positioning function 218 in the node 210. The positioning function 218 may be implemented in hardware, such as an ASIC or discrete circuits; programmable logic, such as an FPGA, together with appropriate firmware; as one or more software modules executing on a controller, processor, or DSP; or as any combination thereof. The positioning function 218 may request and receive, through the network communication interface 212, information from a serving node 220 of the identified node 216 to be positioned (or other associated node, such as a gateway), as well as information from neighbor nodes 222. As described herein, the information may comprise cell ID, device ID or device name, address information, and the like.

FIG. 9 depicts a requesting node 214 requesting location services regarding a UE 216, and the positioning node 210 obtaining information from the serving node 220 (i.e., the eNodeB) of the UE 216, as well as neighbor nodes 222 (i.e., eNodeBs of neighboring cells). Those of skill in the art will recognize that this arrangement is representative only, and is not limiting. For example, the eNodeB 220 could be both the serving node of the UE 216, and the node requesting location services from the positioning node 210. Alternatively, the UB 216 itself may be the requesting node. As another example, the positioning functionality depicted in node 210 may reside in the eNodeB 220.

In any event, the positioning function 218 may retrieve location information in a civic address format from a local memory or database 224. The node 210 may have been provisioned with civic address information for a plurality of network nodes 220, 222, which are stored in a local memory 224. Alternatively, the positioning node 210 may include a civic address information database 224 including more extensive civic address information. Additionally or alternatively, the positioning function 218 may access resources outside of the wireless communication network 200, such as a civic address information database 226, a GIS system 228, or the like (in some embodiments not shown in FIG. 9, the civic address information database 226 or GIS system 228 may be part of the wireless communication network 200, but external to the node 210). In some embodiments, the positioning function 218 is further operative to translate location information between a civic address format and 3GPP positioning formats.

The network communication interface 212 is further operative to transmit a positioning report to the requesting node 214. As described above, the positioning report may include location information in a civic address format, in a 3GPP positioning format, or both. Furthermore, the network communication interface 212 may report a positioning failure, and optionally the cause of the failure, if the positioning function 218 is unable to obtain sufficiently accurate location information regarding the identified node.

The use of civic address information in providing positioning and location services in wireless communication networks, and the concomitant network signaling, offer numerous advantages over prior art systems. Embodiments disclosed herein provide accurate and flexible functionality, and are particularly well-suited to indoor positioning, where many prior art positioning methods perform poorly or fail altogether. Embodiments disclosed herein may facilitate the handling of emergency calls, as they are complementary to above-described IETF efforts to integrate civic address information with emergency call routing in IP networks. The hybridized positioning methods disclosed herein offer greater flexibility and improved accuracy in the provision of positioning and location services. Furthermore, by translating location information between a civic address format and 3GPP positioning formats, embodiments of the present invention may be deployed into wireless communication networks with minimum impact on established signaling standards.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of providing location services in a wireless communication network, comprising:
    receiving, at a first network node, a positioning request, including a civic address format indicator, requesting the geographic location of an identified, second network node;
    obtaining, via a positioning function in the first network node, location information associated with the identified, second node in a civic address format; and
    transmitting a positioning response including the location information in at least the civic address format;
    wherein the civic address format includes one or more Information Elements (IE) selected from the group consisting of unit number, street number, street name, city name, county name, state name, postal code, road number, and identifying comment.

2. The method of claim 1 wherein the positioning response includes uncertainty information in the location information.

3. The method of claim 1 wherein the positioning response includes confidence information in the location information.

4. The method of claim 1 further comprising
    translating the obtained location information from the civic address format to a different positioning format; and
    wherein transmitting the positioning response comprises transmitting the location information in at least the translated format.

5. The method of claim 4 wherein the other positioning format is a format defined by the Internet Engineering Task Force for the routing of emergency calls.

6. The method of claim 1 wherein at least some of the IEs have a hierarchical order corresponding to accuracy, and wherein receiving a positioning request comprises receiving a positioning request specifying a requested accuracy by identifying a hierarchical level of IE.

7. The method of claim 1 wherein the civic address format further includes one or more IEs, each of which includes an aspect of a location of the identified node in a 3GPP positioning format.

8. The method of claim 1 wherein obtaining location information associated with the identified, second node comprises retrieving stored location information associated with the identified, second node, the stored location information in a civic address format.

9. The method of claim 1 wherein obtaining location information associated with the identified, second node comprises:
    performing a positioning function to obtain location information; and
    translating the location information to a civic address format.

10. The method of claim 1 wherein obtaining location information associated with the identified, second node comprises:
    obtaining first location information in a civic address format;
    obtaining second location information not in a civic address format; and
    using the second location information to improve the accuracy of the first location information.

11. The method of claim 1 wherein obtaining location information associated with the identified, second node comprises:
    obtaining identification of wireless network nodes considered neighbor nodes to the identified, second node to be positioned; and
    performing an address lookup based on the received neighbor node information.

12. A method by a first node in a wireless communication network, of estimating the position of an identified, second node comprising:
    receiving, at the first node, a positioning request for the geographic location of an identified, second network node;
    receiving, at the first node, information regarding a serving node or an associated gateway node for the identified, second node to be positioned, and neighboring nodes;

analyzing, by a positioning function in the first node, the received information;

based on the received information, determining a position estimate for the identified, second node, the estimate expressed in civic address format; and reporting the position estimate for the identified, second node;

wherein the civic address format includes one or more Information Elements (IE) selected from the group consisting of unit number, street number, street name, city name, county name, state name, postal code, road number, and identifying comment.

13. The method of claim 12 wherein the civic address format further includes one or more IEs, each of which includes an aspect of a location of the identified, second node in a 3GPP positioning format.

14. The method of claim 12 wherein reporting the position estimate for the identified, second node comprises reporting the position estimate in the civic address format.

15. The method of claim 12 further comprising:
performing a translation of the position estimate from the civic address format to a 3GPP positioning format; and
wherein reporting the position estimate for the identified, second node comprises reporting the position estimate in the 3GPP positioning format.

16. The method of claim 12 wherein the positioning request requests one of a particular Quality of Service (QoS) level and response time, and further comprising, based at least on the requested QoS or response time, determining a number of times to attempt positioning the identified, second node by other methods, prior to executing this method.

17. The method of claim 12 wherein the positioning request indicates an emergency call, and wherein this method is performed as the first choice of positioning methods, to position the identified, second node.

18. A hybrid method of providing location services in a wireless communication network, comprising:
receiving a positioning request, requesting the geographic location of an identified network node;
obtaining, via a positioning function, first location information associated with the identified network node in a civic address format;
obtaining, via a positioning function, second location information associated with the identified network node, not in a civic address format;
using the second location information to improve the accuracy of the first location information; and
transmitting the improved location information;
wherein the civic address format includes one or more Information Elements (IE) selected from the group consisting of unit number, street number, street name, city name, county name, state name, postal code, road number, and identifying comment.

19. The hybrid method of claim 18 wherein obtaining second location information not in a civic address format comprises obtaining a position estimate of the identified network node in a 3GPP positioning format.

20. The hybrid method of claim 18 wherein obtaining second location information not in a civic address format comprises obtaining one or more wireless network communication measurements associated with the identified network node.

21. The hybrid method of claim 18 herein transmitting the improved location information comprises transmitting the improved location information in the civic address format.

22. The hybrid method of claim 18 further comprising:
translating the improved location information to a 3GPP positioning format; and
wherein transmitting the improved location information comprises transmitting the improved location information in the 3GPP positioning format.

23. The hybrid method of claim 18 wherein obtaining first location information associated with the identified network node in a civic address format comprises obtaining the first location information from the positioning request.

24. A first node operative in a wireless communication network and having positioning functionality, comprising:
a communication interface operative to receive a positioning request, the positioning request requesting the position of an identified, second network node, and further operative to transmit a response including a position estimate of the identified, second node; and
a positioning function operative to estimate a position associated with the identified, second network node, the position being in a civic address format including one or more Information Elements (IE) selected from the group consisting of unit number, street number, street name, city name, county name, state name, postal code, road number, and identifying comment.

25. The network node of claim 24 wherein the received positioning request includes a civic address format indicator, and wherein the communication interface is further operative to transmit the location of the identified, second node in the civic address format.

26. The network node of claim 24 wherein the communication interface is further operative to access an external civic address information server.

* * * * *

UNITED STATES PATENT AND TRADEMARK OFFICE
CERTIFICATE OF CORRECTION

PATENT NO. : 8,929,918 B2
APPLICATION NO. : 12/871984
DATED : January 6, 2015
INVENTOR(S) : Siomina et al.

It is certified that error appears in the above-identified patent and that said Letters Patent is hereby corrected as shown below:

In the Claims

In Column 18, Line 12, in Claim 4, delete "comprising" and insert -- comprising: --, therefor.

In Column 20, Line 14, in Claim 21, delete "claim 18 herein" and insert -- claim 18 wherein --, therefor.

Signed and Sealed this
Twenty-eighth Day of July, 2015

Michelle K. Lee
*Director of the United States Patent and Trademark Office*